(12) United States Patent
DeBartolo, Jr. et al.

(10) Patent No.: US 6,342,675 B1
(45) Date of Patent: Jan. 29, 2002

(54) FEED THROUGH BOX ASSEMBLY FOR RACEWAY

(75) Inventors: Joseph V. DeBartolo, Jr., North Stonington; Stephen R. Ewer, Milford, both of CT (US); Daniel J. Methot, Westford, MA (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/599,028

(22) Filed: Jun. 22, 2000

(51) Int. Cl.[7] ................................................ H02G 3/08
(52) U.S. Cl. ............................. 174/50; 174/49; 220/3.2
(58) Field of Search ............................. 174/50, 48, 49, 174/60, 67, 68.3, 95, 99 R; 220/3.2, 3.3, 3.8, 4.02, 4.01; 52/220.1, 220.3, 220.5, 220.7

(56) References Cited

U.S. PATENT DOCUMENTS

| | | | | |
|---|---|---|---|---|
| 4,295,575 A | * | 10/1981 | Flachbarth | 220/3.8 |
| 4,952,163 A | * | 8/1990 | Dola et al. | 174/48 |
| 5,010,211 A | * | 4/1991 | Bartee | 174/48 |
| 5,134,250 A | * | 7/1992 | Caveney et al. | 174/101 |
| 5,257,487 A | * | 11/1993 | Bantz et al. | 174/48 |
| 5,486,650 A | * | 1/1996 | Yetter | 174/53 |
| 5,594,205 A | * | 1/1997 | Cancellieri et al. | 174/53 |
| 5,685,113 A | * | 11/1997 | Reuter et al. | 52/220.7 |
| 5,784,841 A | * | 7/1998 | Nowell | 174/49 |
| 5,907,936 A | * | 7/1999 | Littrell | 174/49 |
| 5,942,724 A | * | 8/1999 | Russo et al. | 174/48 |
| 6,084,180 A | * | 6/2000 | DeBartolo, Jr. et al. | 174/95 |
| 6,189,269 B1 | * | 2/2001 | De Zen | 52/220.5 |

* cited by examiner

*Primary Examiner*—Dean A. Reichard
*Assistant Examiner*—Angel R. Estrada
(74) *Attorney, Agent, or Firm*—Garrett V. Davis; Alfred N. Goodman

(57) ABSTRACT

A feed through receptacle box assembly includes a base and a housing for supporting a receptacle and connecting to a raceway. A channel member is removably coupled to the base to provide a closed passage for feeding a wire or cable through the housing to isolate the wire or cable from the receptacle. The receptacle can be a duplex electrical receptacle or a telecommunications port that is connected to a respective wire or cable passing through the raceway. In embodiments, the channel member includes at least one intermediate wall forming a plurality of side-by-side passages. The channel member includes frangible lines for separating a portion of the channel member to allow access to a respective wire or cable passing through the passages of the channel member.

44 Claims, 8 Drawing Sheets

FEED THROUGH BOX ASSEMBLY FOR RACEWAY

FIELD OF THE INVENTION

The present invention is directed to a receptacle box assembly for coupling to a surface mounted raceway. More particularly, the invention is directed to a receptacle box assembly having at least one channel for feeding wires or cables from a raceway through the box.

BACKGROUND OF THE INVENTION

Surface mounted raceways and recessed raceways are commonly used in buildings for enclosing electrical wires and communication cables. Raceways provide a convenient system for directing cables and wires from a source to the point of use. Preformed raceways are generally manufactured in predetermined lengths and are cut to a desired length and assembled at the work site.

Raceways often have two or more distinct passages for selectively carrying groups of cables and wires. For example, a raceway can include a first passage for electrical power cables and a second passage for telephone lines and other communication cables. The raceways typically include an internal wall to separate the passages and the wires or cables from each other. A suitable receptacle is usually mounted directly to the raceway for accessing the wires and cables contained in the raceway.

One example of a raceway is disclosed in U.S. Pat. No. 4,952,163 to Dola et al. This patent discloses a raceway that can be recessed in a wall or other support structure. The raceway includes multiple compartments for carrying wires. A receptacle outlet housing is attached directly to the raceway. The receptacle outlet housing is an integral unit having a front wall and a back wall connected by end walls and removable side panels. The back wall includes an opening that is located to access a particular compartment of the raceway for directing wires from the compartment into the housing for attaching to a wiring device.

Another example of a raceway is disclosed in U.S. Pat. No. 5,010,211 to Bartee. This device includes an electrical duct system for mounting in the floor of a building and includes several longitudinal passages. An access opening is formed in the top of the raceway for supporting electrical outlet devices. A divider is positioned in the housing to divide the interior into different chambers for mounting different electrical outlets and for separating the wires to the different outlets.

These prior raceway assemblies are generally effective for housing wires and cables and supporting electrical outlets. However, these devices do not provide the convenient assembly of components while keeping the wires in the raceway separated from each other.

SUMMARY OF THE INVENTION

The present invention is directed to a receptacle box assembly for coupling to a raceway. More particularly, the invention is directed to a receptacle box and raceway assembly for enclosing various wires and cables and for isolating the wires or cables from one another within the box.

Accordingly, a primary object of the invention is to provide a receptacle box assembly for a raceway where the assembly includes at least one channel for separating wires or cables within the receptacle box.

A further object of the invention is to provide an outlet cover assembly that is simple to assemble and that can be disassembled using commonly available tools.

Another object of the invention is to provide a receptacle box assembly enclosing a receptacle and having at least one closed channel for feeding wires or cables from a raceway through the assembly.

Another object of the invention is to provide a receptacle box assembly having a base and a channel member removably coupled to the base forming at least one closed channel for feeding wires or cables through the assembly.

A further object of the invention is to provide a receptacle box assembly that can be coupled to a multiple compartment raceway, where the assembly includes at least one channel with a removable portion for feeding a wire or cable from the raceway into the interior of the receptacle box.

Another object of the invention is to provide a receptacle box assembly for coupling to a raceway, where the assembly includes a base for supporting a plurality of receptacles and a channel member for guiding wires or cables from the raceway to a respective receptacle.

A further object of the invention is to provide a receptacle box assembly for connecting to a raceway, where the assembly includes a base and a channel member having at least two passages and where the channel member includes frangible lines for separating at least one portion of the channel member to form an opening for feeding wires or cables from the raceway to compartments within the assembly.

The objects of the invention are basically attained by providing a receptacle box assembly for use with a raceway. The assembly comprises a base having a bottom wall with first and second ends and first and second opposite side edges; a channel member removably coupled to the base to define a first passage extending between the first side edge and the second side edge of the base, the channel member having a first open end adjacent the first side edge and a second open end adjacent the second side edge of the base; and a housing coupled to the base to form a cavity, the housing having a top wall, first and second end walls and first and second side walls, the first and second side walls having at least one separable member aligned with the first and second open ends of the channel member and the housing having at least one opening for receiving a receptacle.

The objects of the invention are further attained by providing a receptacle box assembly for use with a raceway. The assembly comprises a base having a bottom wall with first and second ends and first and second side edges; a channel member coupled to the base to define a first passage; and a housing coupled to the base to form a cavity. The housing has a top wall spaced from the base and first and second side walls, and the first side wall of the housing has a first opening aligned with the first passage of the channel member.

The objects of the invention are still further attained by providing an electrical box and raceway assembly. The assembly comprises a base having a bottom wall with first and second opposite side edges; a channel member coupled to the base, the channel having a first longitudinal passage; a housing coupled to the base to form a cavity, the base having a top wall spaced from the base, the top wall having an opening for receiving at least one receptacle, the housing further having a first side wall and second side wall, the first side wall having an opening aligned with the channel member; and a first raceway having first and second longitudinal compartments, the raceway having a longitudinal end dimensioned to fit in the opening in the first side wall and to align with the passage of the channel member.

The objects, advantages, and salient features of the invention will become apparent to one skilled in the art in view of the following detailed description of the invention and the attached drawings which form a part of this original disclosure.

BRIEF DESCRIPTION OF THE DRAWINGS

The following is a brief description of the drawings in which.

DETAILED DESCRIPTION OF THE INVENTION

Figure 1:
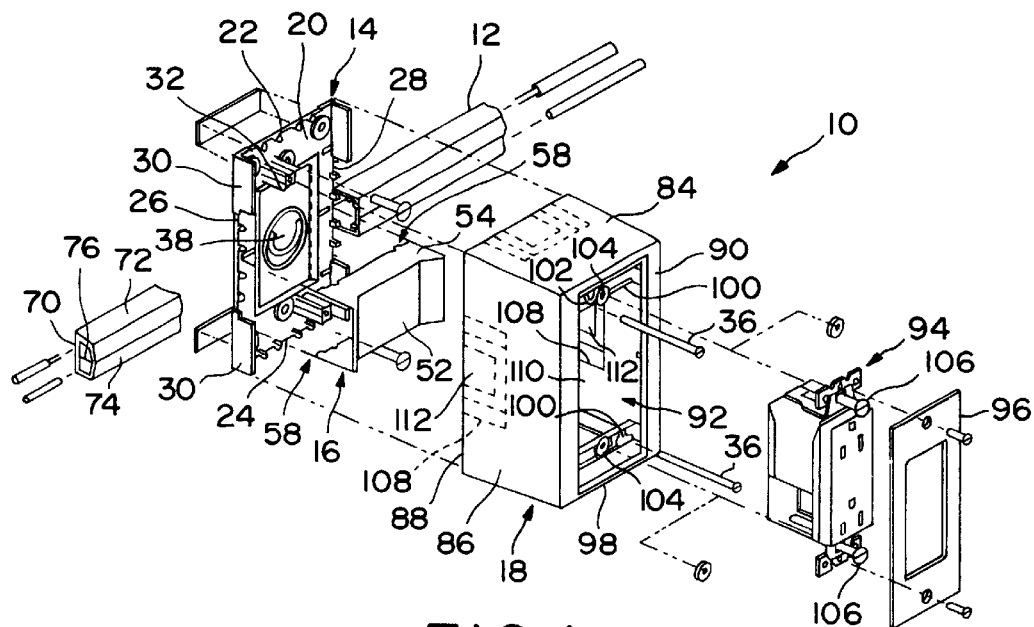
FIG. 1 is a perspective exploded view of the receptacle box and raceway assembly in a first embodiment of the invention.
Figure 2:
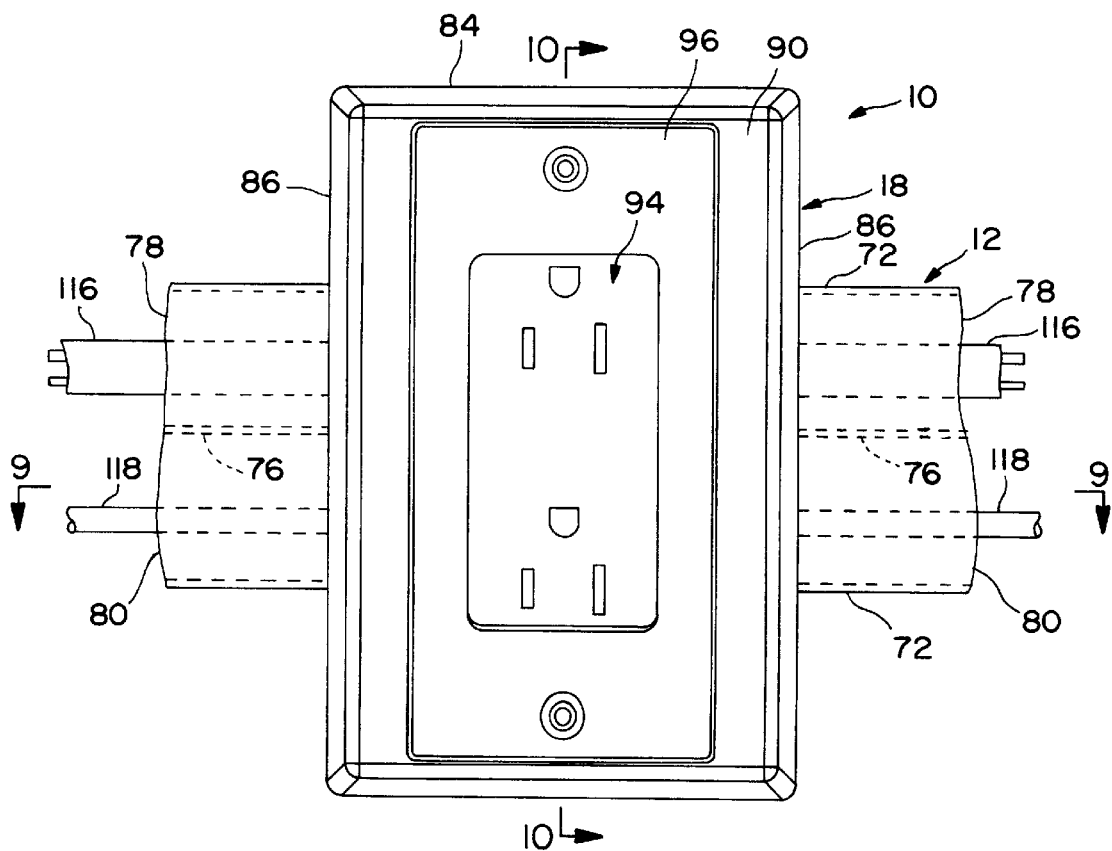
FIG. 2 is a top view of the assembled receptacle box and raceway assembly of FIG. 1.

The present invention is directed to an electrical receptacle box assembly 10 for coupling to a raceway 12. In a first embodiment of the invention shown in FIGS. 1–10, assembly 10 includes a base 14, a channel member 16, and a housing 18, all preferably formed of plastic.

Assembly 10 is primarily intended for use in combination with raceway 12 where raceway 12 carries electrical wires or cables from a source into assembly 10. Typically, assembly 10 is connected to more than one raceway for connecting several wiring devices or receptacles in series. Raceways 12 are coupled to assembly 10 and aligned with channel member 16 as discussed hereinafter.

Figure 4:
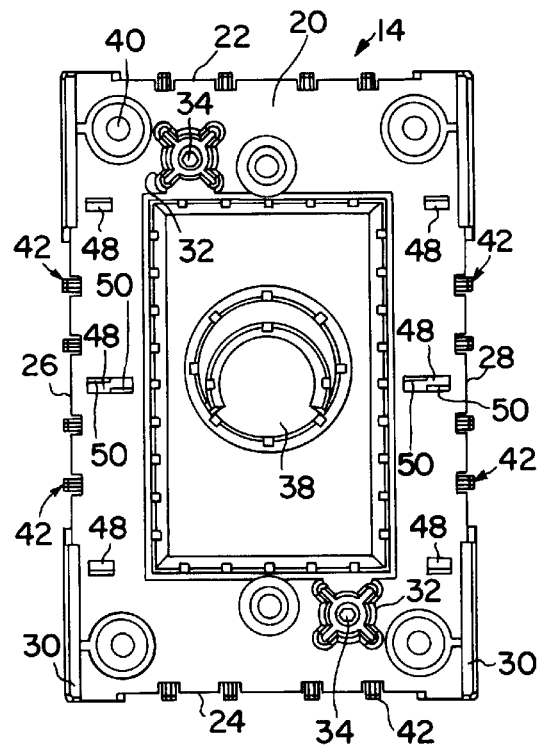
FIG. 4 is a top view of the base of the receptacle box assembly of FIG. 1.

Base 14 as shown in FIGS. 1 and 4 has a generally flat bottom wall 20 with a generally rectangular configuration. Bottom wall 20 has a first end 22, an opposite second end 24, a first side edge 26 and a second side edge 28 opposite first side edge 26. As shown in FIG. 4, each corner of bottom wall 20 includes an upstanding tab 30 for aligning housing 18 on base 14. In the embodiment illustrated, two post members 32 extend from bottom wall 20 and include a hex-shaped opening 34 for receiving a screw 36 for coupling housing 18 to base 14. Several knock-out plates 38 are formed in bottom wall 20 to provide an opening for feeding wires or cables into assembly 10 in certain uses of the base. Knock-out plates 38 are typically not used in the embodiment of the invention where assembly 10 is connected to a raceway. Several apertures 40 are also provided in bottom wall 20 for receiving a screw or other fastener to attach base 14 to a support surface (not shown).

Figure 9:
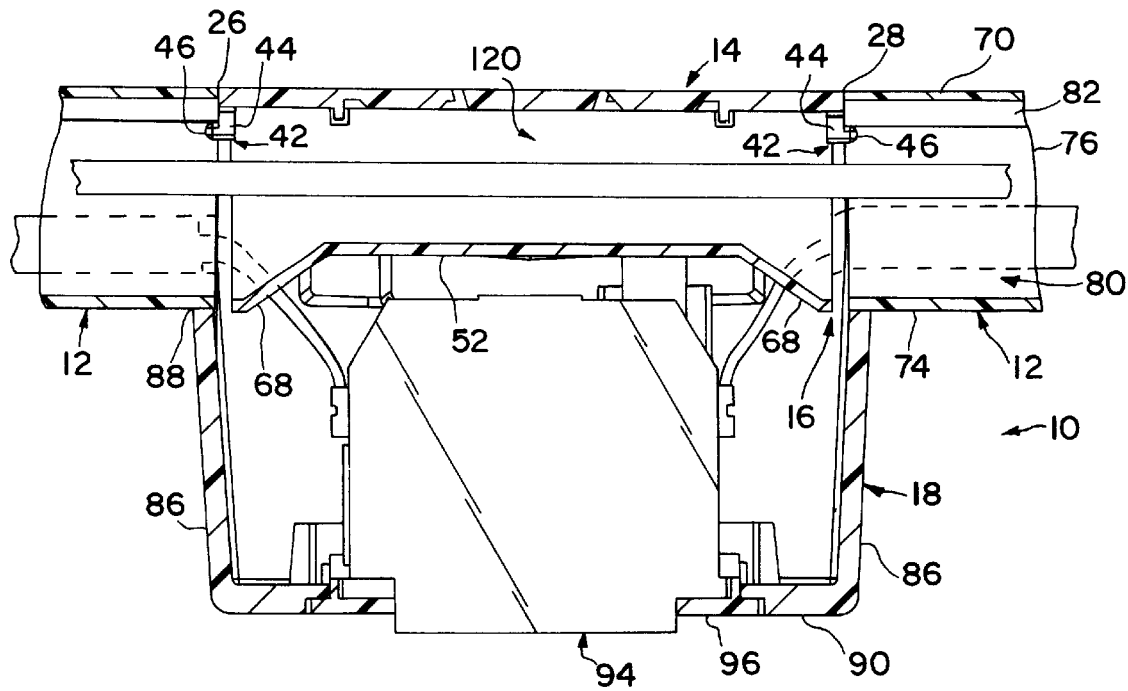
FIG. 9 is a partial cross-sectional view of the assembly taken along line 9—9 of FIG. 2.
Figure 10:
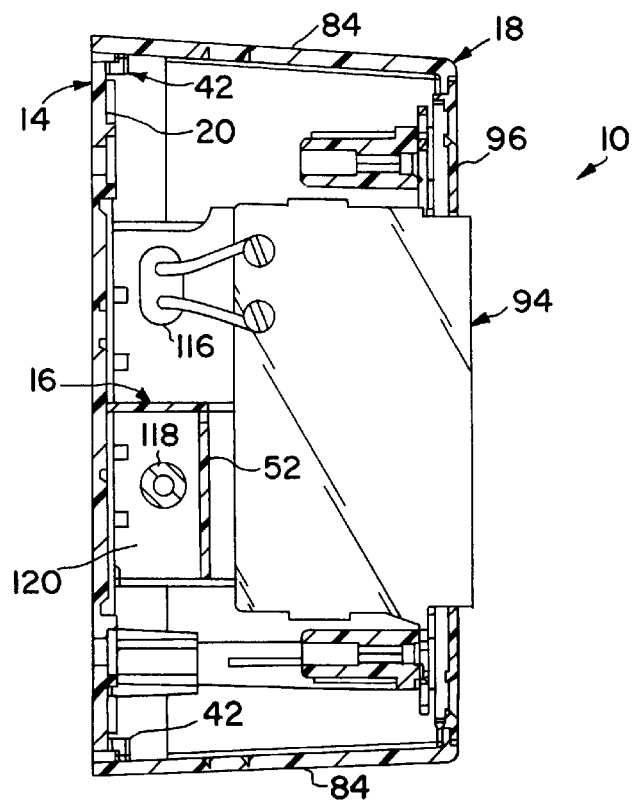
FIG. 10 is a partial cross-sectional view of the assembly taken along line 10—10 of FIG. 2.

Each end 22 and 24 and each side edge 26 and 28 of bottom wall 20 include hook members 42. As shown in FIG. 4, several hook members 42 are spaced apart along each edge between tabs 30. As shown in FIG. 9, each hook member 42 includes a first leg 44 extending upwardly from bottom wall 20 and a second leg 46 extending outwardly from first leg 44 past each side edge of bottom wall 20.

Referring to FIG. 4, several apertures 48 are provided in bottom wall 20 and are spaced apart adjacent each side edge 26 and 28. In the embodiment illustrated, each aperture 48 has a generally rectangular shape with at least one inclined face 50.

Figure 5:
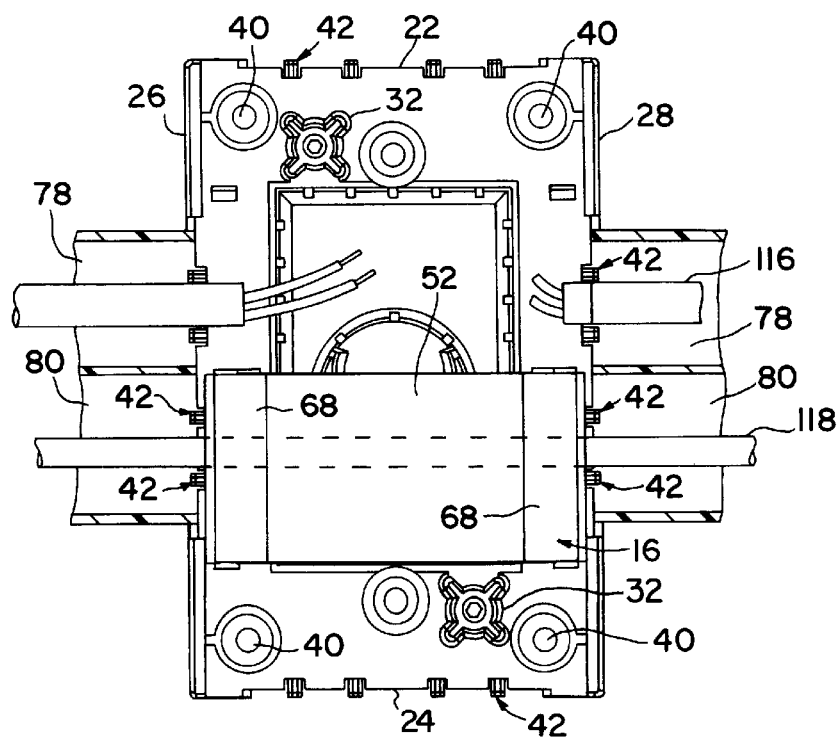
FIG. 5 is a top view of the receptacle box assembly of FIG. 1 showing the channel member coupled to the base and a telecommunication cable passing through the channel.
Figure 6:
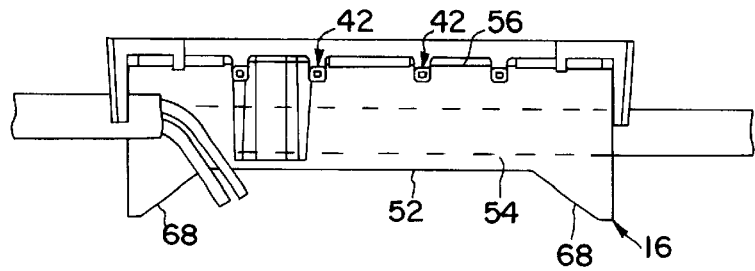
FIG. 6 is an end view of the base and channel member of FIG. 5.
Figure 7:
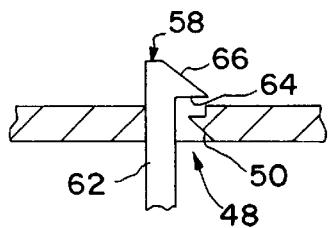
FIG. 7 is a partial side view in cross section showing the barb on the channel member hooked into an opening in the base.

Channel member 16 has a planar top wall 52 and side walls 54. In one embodiment of the invention, side walls 54 extend substantially perpendicular to top wall 52. Side walls 54 have a bottom edge 56 with a barb 58 extending downward in the plane of each side wall 54. Barbs 58 are positioned on bottom edge 56 toward the ends of side walls 54 to securely attach channel member 16 to base 14. Referring to FIG. 7, barbs 58 have a leg 62, a ledge 64 and an inclined face 66. Barbs 58 are dimensioned to fit within apertures 48 with inclined face 66 of barb 58 mating with inclined face 50 of aperture 48. Barb 58 is dimensioned to snap through aperture 48 of base 14 so that ledge 64 engages a bottom surface of bottom wall 20 of base 14 to coupled channel 16 to base 14. As shown in FIGS. 4 and 5, apertures 48 in base 14 are spaced so that channel member 16 can be positioned in different locations with respect to base 14. Each aperture 48 is oriented to align channel member 16 with raceway 12.

Top wall 52 of channel member 16 is coupled to an inclined face 68 at each end thereof. Each inclined face 68 extends in a generally upward direction with respect to top wall 52 to form enlarged open ends. In the illustrated embodiment of the invention, channel member 16 has a length substantially equal to the length of base 14 between first side edge 26 and second side edge 28 to form a substantially closed channel through assembly 10.

Raceway 12 forms a closed passage for guiding electrical and fiber optic wires and cables to assembly 10 in a manner similar to raceways as known in the art. In the embodiment illustrated, raceway 12 includes a bottom wall 70 and side walls 72. A top wall 74 is coupled to side walls 72 by suitable snap coupling members (not shown) as known in the art. An intermediate wall 76 is integrally formed with bottom wall 70 and extends substantially parallel to side walls 72 for forming a first compartment 78 and a second compartment 80 within raceway 12. Several strengthening ribs 82 extend from bottom wall 70 and extend in a longitudinal direction with respect to raceway 12. In the embodiment of FIGS. 1–10, raceway 12 is formed with two parallel compartments for guiding wires and cables. In further embodiments, more than two parallel compartments can be provided in raceway 12. Typically, raceway 12 is made of a plastic, such as a synthetic resin, by extrusion molding.

Housing 18 has a generally rectangular configuration complementing the shape of base 14. Referring to FIG. 1, housing 18 includes opposite end walls 84 and opposite side walls 86. Housing 18 has a substantially open bottom end 88 for receiving base 14. A top wall 90 of housing 18 is provided with an opening 92 for receiving a receptacle 94 and a cover plate 96. As shown in FIG. 1, a ledge 98 extends around opening 92 for mating with cover plate 96.

Figure 3:
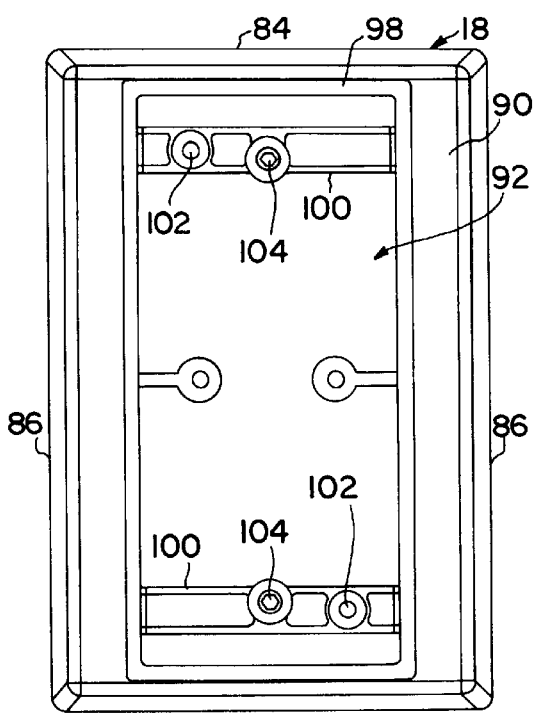
FIG. 3 is a top view of the housing of the receptacle box assembly of FIG. 1 with the receptacle and cover plate removed.

As shown in FIG. 3, two brace members 100 extend across opening 92. Brace members 100 include an offset aperture 102 aligned with post 32 of base 14 for receiving screw 36 to couple housing 18 to base 14. Brace 100 also includes a centrally located aperture 104 for receiving a mounting screw 106 for coupling receptacle 94 to each brace 100.

Figure 8:
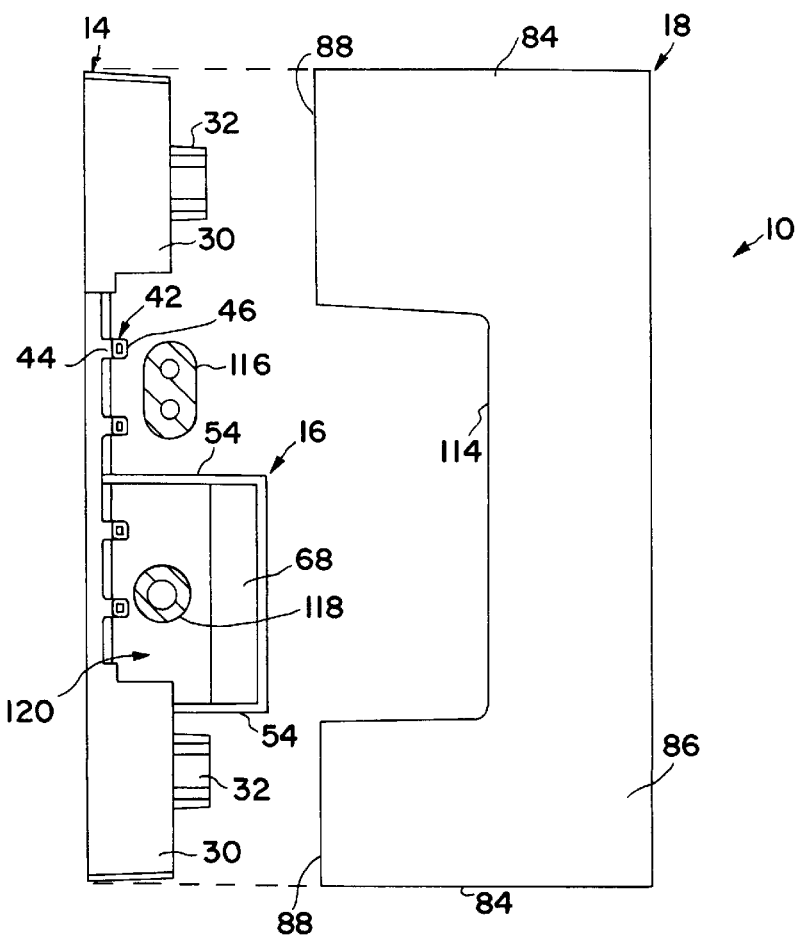
FIG. 8 is a side elevational, exploded view of the base, channel member and housing of the embodiment of FIG. 1.

Side walls 86 of housing 18 include a plurality of substantially U-shaped tear lines 108. Tear lines 108 are formed as recesses on an inner face 110 of side wall 86 as shown in FIG. 1. Tear out members 112 defined by tear lines 108 are removable from side wall 86 to form an opening 114 as shown in FIG. 8 that is dimensioned to receive an end of raceway 12. As shown in FIG. 9, the end of raceway 12 is inserted into opening 114 of side wall 86 to contact base 14.

The receptacle box assembly 10 in the embodiment of FIGS. 1–10 is intended for use with raceway 12 that includes at least two compartments for carrying wires or cables. In the illustrated embodiment, first compartment 78 of raceway 12 carries an electrical wire 116 for supplying power to receptacle 94, such as a duplex plug or switch. Second compartment 80 of raceway 12 as shown carries a telecommunications cable or wire 118. Telecommunications cable 118 can be a low voltage wire, such as a conventional telephone wire, optical fiber or other conductor capable of carrying telecommunications or computer data. Preferably, raceway 12 separates higher voltage electrical wire 116 from telecommunication cable 118 by directing each wire or cable through the separate compartments.

In use, base 14 is coupled to a support surface (not shown) by screws or other fasteners. The end of each raceway 12 is positioned to abut side walls 26 and 28 of base 14. As shown in FIG. 8, hook members 42 overlie strengthening ribs 82 of raceway 12. Hook members 42 provide a clamping force against raceway 12 to maintain raceway 12 in position with respect to base 14.

In the embodiment illustrated, electrical wires 116 and telecommunication cable 118 are passed through raceway 12 and into assembly 10. In this embodiment, receptacle 94 is a duplex receptacle that is coupled to electrical wires 116. Electrical wires 116 are carried from raceway 12 through opening 114 in housing 18 and are connected directly to receptacle 94. In one embodiment, electrical wires 116 terminate at receptacle 94. In the embodiment shown, additional electrical wires can be connected to receptacle 94 and directed through another raceway to carry electrical power to another receptacle in series.

Telecommunications cable 118 in this embodiment is carried through second compartment 80 of raceway 12 and directed through the passage 120 of channel member 16 where it continues through to raceway 12 at the opposite end of assembly 10. Channel member 16 is coupled to base 14 to define a passageway 120. Telecommunications cable 118 passes through passageway 120 so that telecommunications cable 118 is isolated from electrical wire 116. Preferably, channel member 16 has a length corresponding substantially to the inner dimension of housing 18 to form a continuous, closed passage between each opening 114. As shown in FIG. 9, channel member 16 can have a length to form a small gap between the ends of channel member 16 and the inner face of side walls 86 to prevent interference during assembly.

It will be appreciated that receptacle 94 in the illustrated embodiment is shown as a duplex electrical receptacle for purposes of illustration. In alternative embodiments, receptacle 94 can be a telephone jack, data connection port or other receptacle that is connected to the appropriate wire or cable from raceway 12. In this embodiment, telecommunications cable 118 would be connected directly to receptacle 94 and electrical wire 116 will be fed through passageway 120 of channel 16 to isolate electrical wire 116 from telecommunications cable 118.

Embodiment of FIGS. 11–20

Referring to FIGS. 11–20, a second embodiment of receptacle box assembly 130 is shown. As in the previous embodiment, assembly 130 includes a base 132, a channel member 134 and a housing 136. A raceway 138 carrying an electrical wire 140 and a telecommunications cable 142 is connected to assembly 130. Raceway 138 is substantially identical to raceway 12 of the embodiment of FIGS. 1–10 so that identical components are identified by the same reference number with the addition of a prime.

Base 132 has a bottom wall 144 provided with knockouts 146. Bottom wall 144 has a rectangular shape with tabs 148 extending upwardly and positioned along each corner of bottom wall 144. Bottom wall 144 has a first end 150 and a second end 152 opposite first end 150. Bottom wall 144 has a first side edge 154 and a second side edge 156 extending between first end 150 and second end 152. As in the previous embodiment, first and second side edges 154 and 156 includes hook members 158 for engaging raceway 138. Post members 160 extend upwardly from bottom wall 144 and are spaced apart a suitable distance for supporting a receptacle 162.

Figure 11:
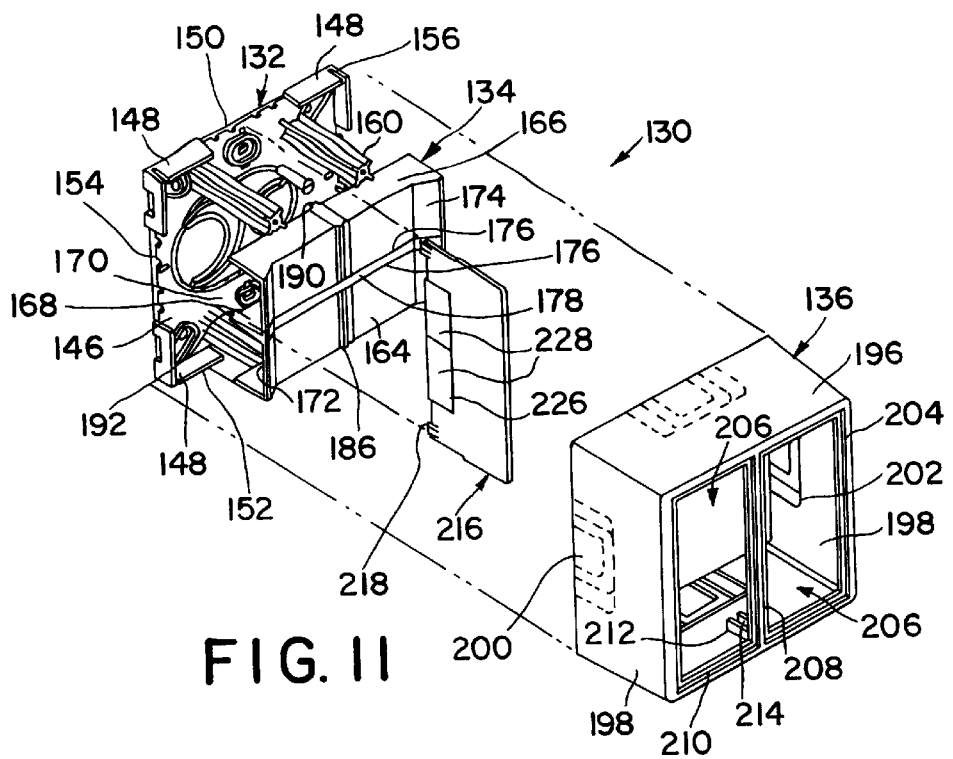
FIG. 11 is an exploded perspective view of the receptacle box assembly in a second embodiment of the invention and showing the channel member having two parallel passages and divider.

As shown in FIG. 11, channel member 134 includes a top wall 164, side walls 166 and an intermediate wall 168 between side walls 166 forming a first passage 170 and a second passage 172. An inclined portion 174 extends from each end of top wall 164 to provide an enlarged opening into first passage 170 and second passage 172. In further embodiments, channel member 134 can have more than two longitudinal passages.

Top wall 164 of channel member 134 is preferably formed with at least one and generally two frangible lines 176 extending longitudinally along channel member 134. Frangible lines 134 are substantially parallel and spaced apart a distance to form a center portion 178. Intermediate wall 168 is coupled to an inner face of center portion 178 between frangible lines 176. Frangible lines 176 allow a portion of channel member 134 to be separated to form a single passage in a manner similar to the embodiment of FIGS. 1–10 depending on the particular needs of assembly 130.

Figure 14:
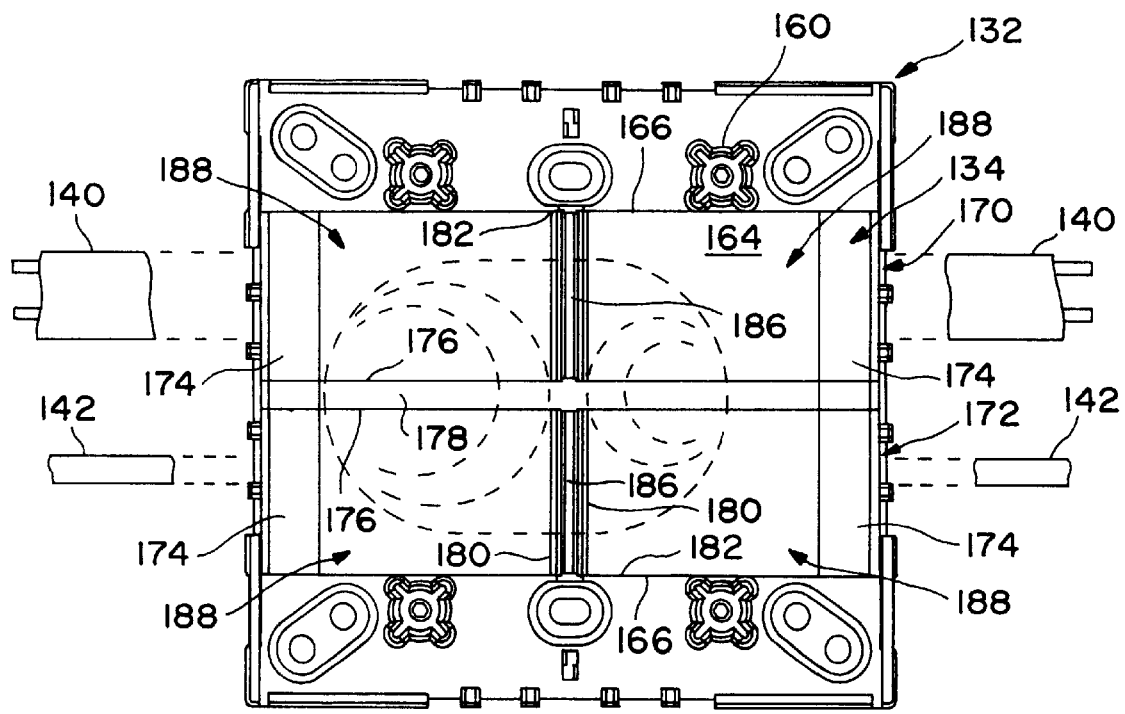
FIG. 14 is a top view of the channel member coupled to the base.
Figure 15:
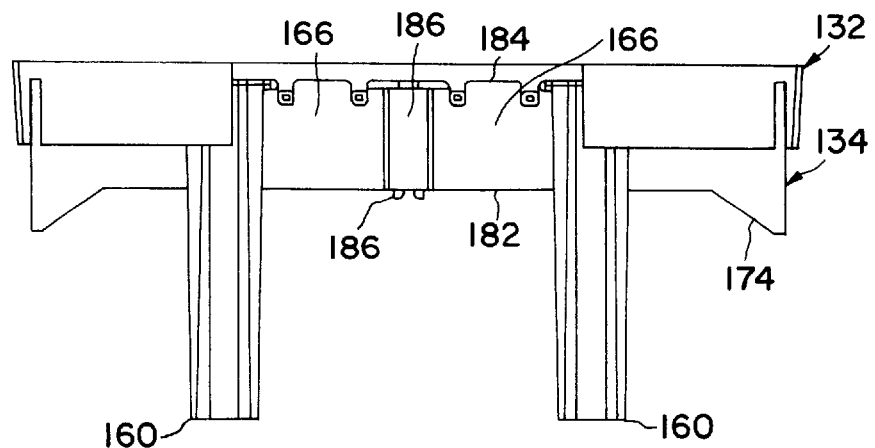
FIG. 15 is an end view of the channel member and base FIG. 14.
Figure 16:
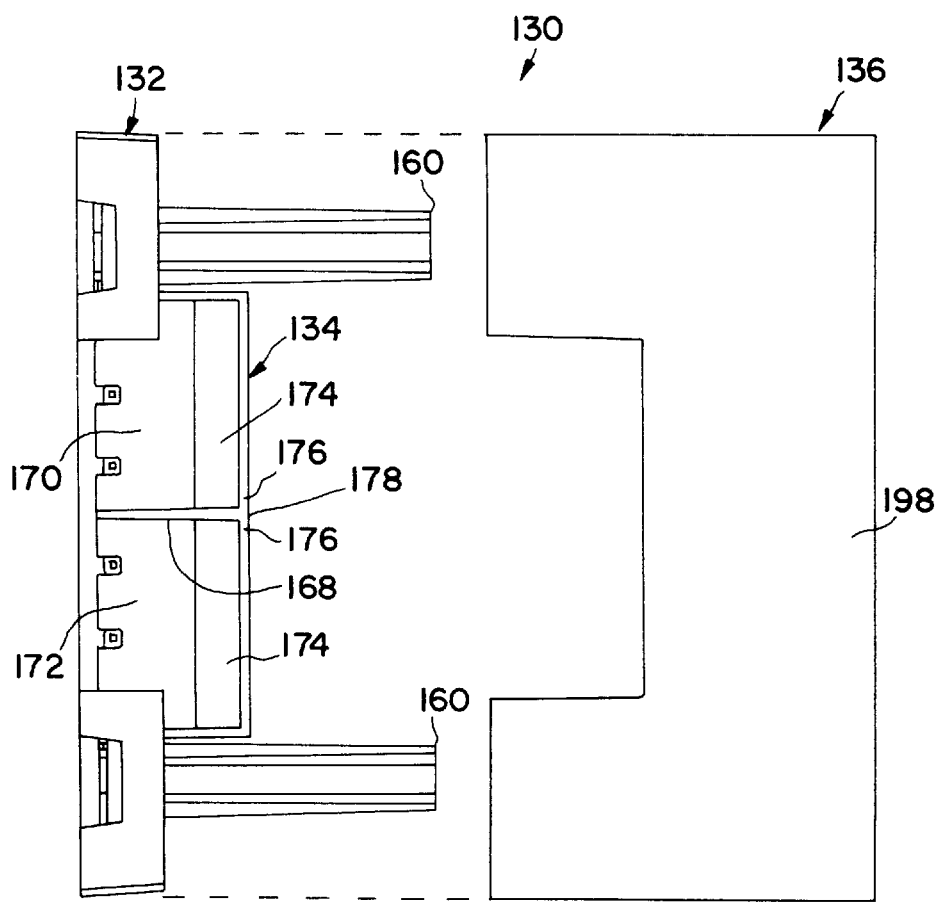
FIG. 16 is an exploded side elevational view of the assembly of the embodiment of FIG. 11 showing the channel member, base and housing.

Transverse frangible lines 180 extend transversely from longitudinal frangible lines 176 to side edges 182 of top wall 164. As shown in FIG. 14, frangible lines 180 continue from side edges 182 and extend across side walls 166 to a bottom edge 184 of side walls 166. Preferably, two spaced transverse frangible lines 180 are provided to define an intermediate portion 186 extending transversely across top wall 164 and side walls 166.

As shown in FIG. 14, frangible lines 176 and 180 divide channel member 134 into four quadrants 188. One or more quadrants 188 can be separated from channel member 134 by breaking along frangible lines 176 and 180.

Channel member 134 includes a barb 190 extending from bottom edge 184 of intermediate portion 186. Similar barbs 192 extend from a bottom edge of intermediate wall 168. Barbs 190 and 192 are substantially the same as the barbs in the embodiment of FIGS. 1–10 and are received in complementing apertures 194 in bottom wall 144 of base 132 for coupling channel member 134 to base 132.

Housing 136 includes end walls 196 and side walls 198. Tear out members 200 defined by tear lines 202 are formed in end walls 196 and side walls 198 to form openings to feed wires or cables into housing 136. Housing 136 includes a top wall 204 having two openings 206 separated by an intermediate member 208. Openings 206 include a stepped portion 210 as shown in FIG. 11. Ribs 212 extend from an inner face of end walls 196 adjacent intermediate portion 208 to form a recess 214 as shown in FIG. 11.

Figure 12:
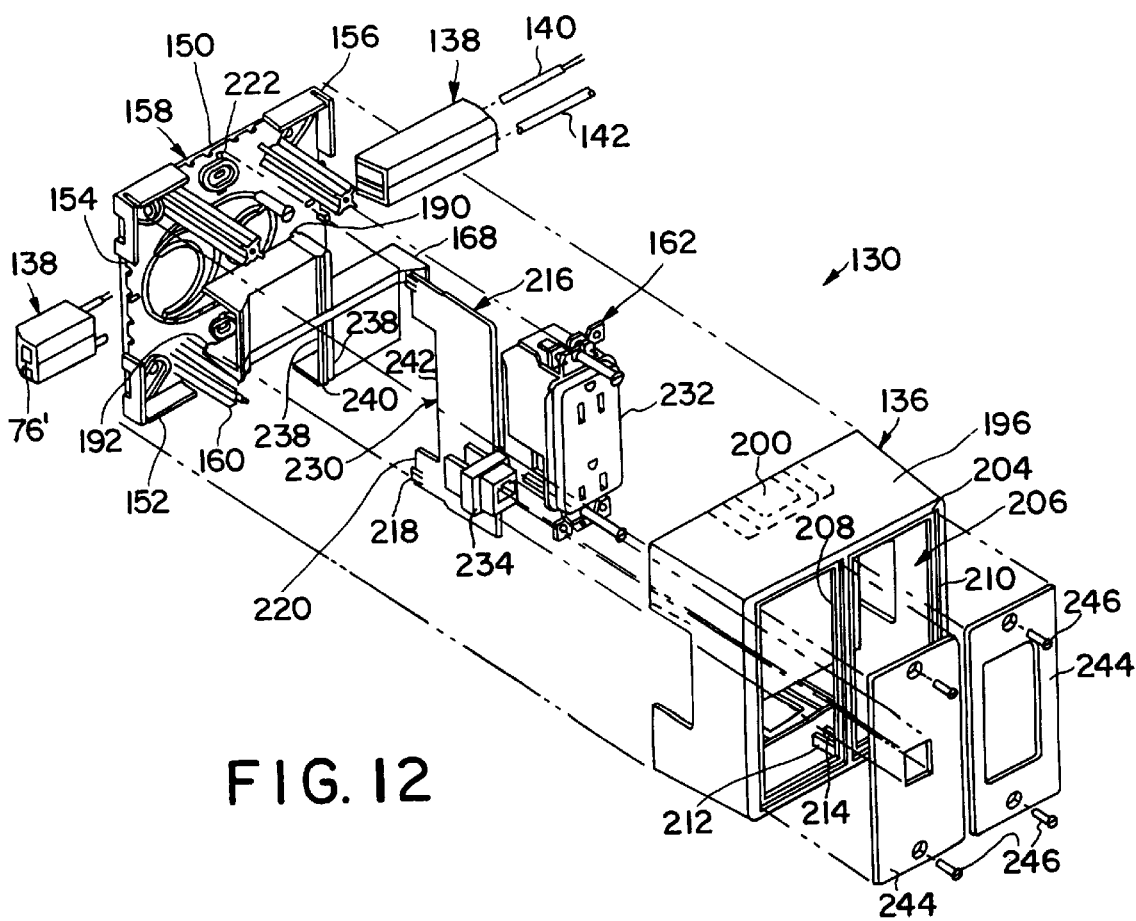
FIG. 12 is an exploded perspective view of the assembly of FIG. 11 showing the raceway and receptacle.
Figure 13:
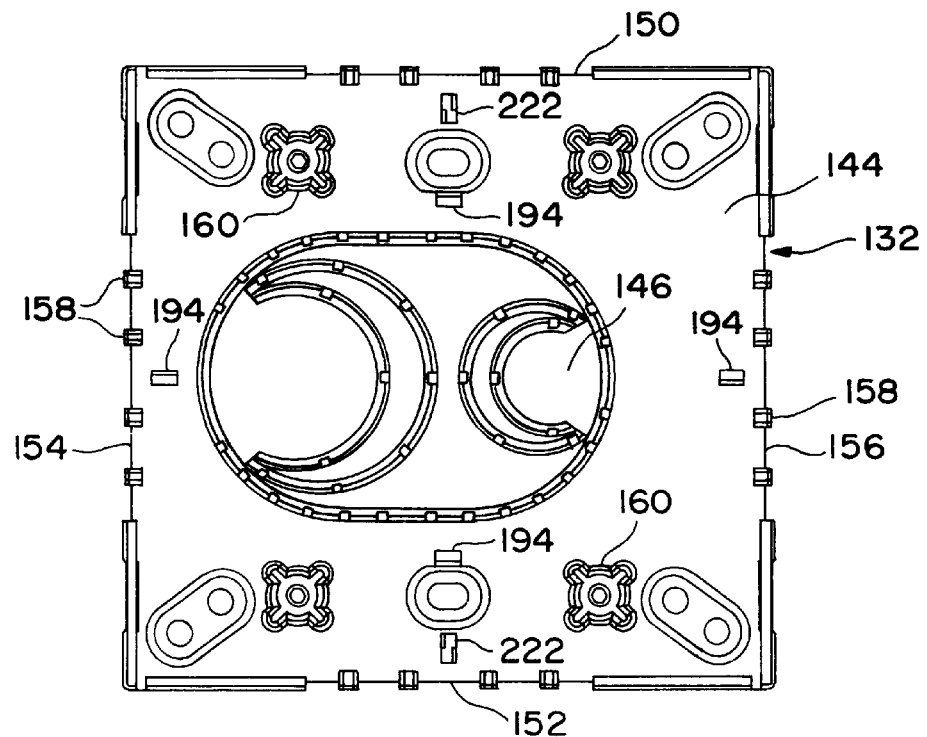
FIG. 13 is a top view of the base of the receptacle box assembly of FIG. 11.
Figure 18:
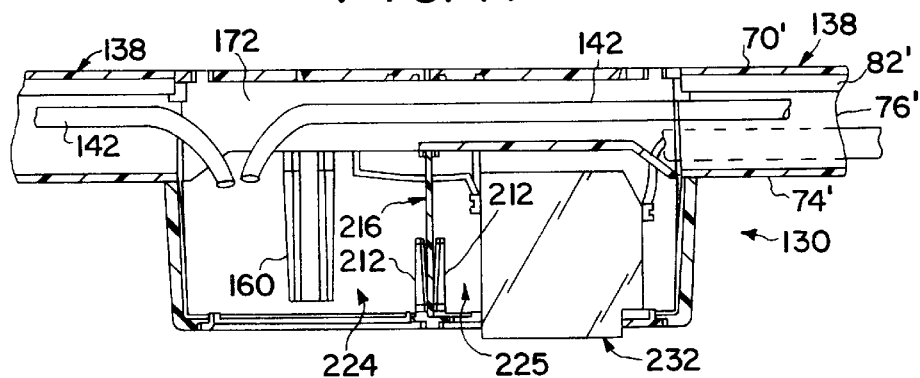
FIG. 18 is a cross-sectional view of the assembly taken along line 18—18 of FIG. 17.
Figure 19:
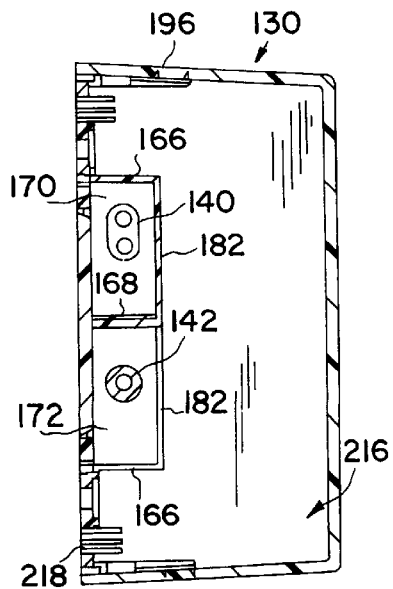
FIG. 19 is a cross-sectional view of the assembly taken along line 19—19 of FIG. 17.
Figure 20:
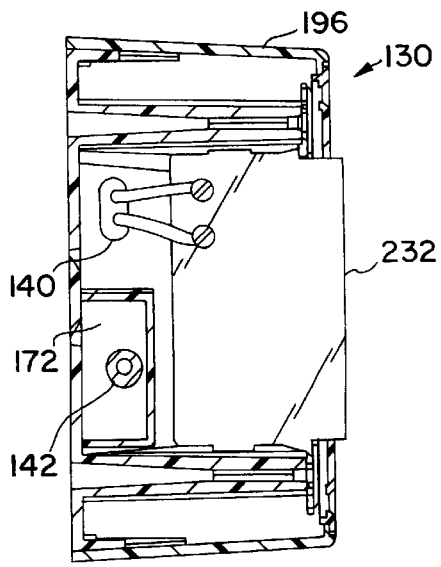
FIG. 20 is a cross-sectional view of the assembly taken along line 20—20 of FIG. 17.

Referring to FIG. 11, a dividing wall 216 is removably coupled to base 132 by barbs 218 extending from a bottom edge 220 of dividing wall 216 that are received in a complementing aperture 222 in bottom wall 144. In the embodiment shown, three closely spaced barbs 218 are formed at each end of dividing wall 216. Each barb 218 has a hook-like end for coupling to openings 222 of bottom wall 144. Dividing wall 216 has a shape and dimension complementing the internal dimension and shape of housing 136. Dividing wall 216 is received in recess 214 between ribs 212 of end walls 196 of housing 136 into two separate chambers 224 and 225 as shown in FIG. 18. Frangible lines 226 are provided in dividing wall 216 to define removable tabs 228. Tabs 228 can be separated from dividing wall 216 to form a recess 230 complementing the cross-sectional dimensions of channel member 134 as shown in FIG. 12. Two ribs 238 extend along the top end of intermediate portion 186 of channel member 134 forming a recess 240 for receiving a bottom edge 242 of recess 230 of dividing wall 216.

Receptacle assembly 130 in the embodiment illustrated is dimensioned for supporting two receptacles 162. In further embodiments, assembly 130 can be dimensioned to support any desired number of receptacles.

Assembly 130 is assembled and used in a manner similar to the embodiment of FIGS. 1–10. Base 132 is attached to a support, and raceways 138 are coupled to side edges 154 and 156 of base 132. Channel member 134 is coupled to base 132 so that passages 170 and 172 align with the compartments of raceway 138. In the illustrated embodiment, assembly 130 is intended to support a duplex receptacle 232 and a telecommunications port 234. Duplex receptacle 232 and telecommunications port 234 are mounted to posts 160 so that each is positioned in a respective opening 206 of housing 136. Dividing wall 216 is fitted into housing 136 to separate duplex receptacle 232 from telecommunications port 234. A cover plate 244 is coupled to each of receptacle 232 and port 234 by screws 246. Cover plates 244 are dimensioned to fit in stepped portion 210 of top wall 204 to capture housing 136 and couple housing 136 to base 132.

Figure 17:
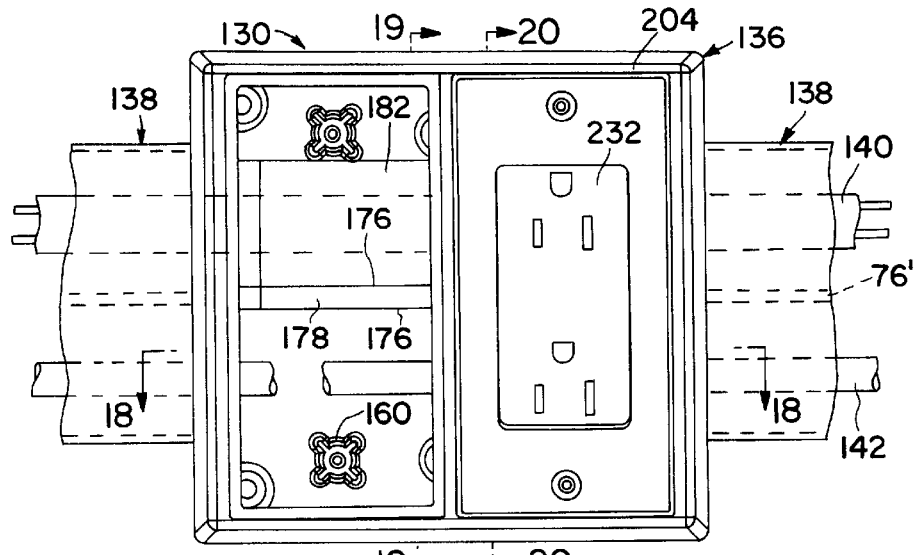
FIG. 17 is a top view of the receptacle box and raceway assembly of the embodiment of FIG. 11 showing the wires or cables passing from the raceway into the housing.

Raceway 138 feeds electrical wires 140 and telecommunication cables 142 through a respective passage 170 and 172 of channel member 134. A respective quadrant 188 of channel member 134 forming each passage 170 and 172 is separated by frangible lines 176 and 180 to allow access of the respective passage of channel 134 to duplex receptacle 232 and telecommunications port 234 as shown in FIG. 12. In this manner, the electrical wire 140 is able to enter the chamber 225 of housing 136 supporting duplex receptacle 232. The remaining portion of first passage 170 extends through chamber 224 to isolate the electrical wire 140 from chamber 224 and telecommunications port 234 as shown in FIG. 17. In a similar manner, the telecommunications cable 142 extends through second passage 172 to isolate telecommunications cable 142 from the chamber 225 enclosing duplex receptacle 232 as shown in FIG. 18.

The illustrated embodiments show a raceway having two compartments and a channel member having one or two longitudinal passages. In further embodiments, the raceway can have three or more passages and the channel member can have any desired number of passages. For example, the assembly can be a three-gang assembly coupled to a raceway having three compartments. The channel member can have three passages aligned with the compartments of the raceway. The channel member can have a plurality of separable portions to enable a wire or cable to be fed to a designated receptacle while forming an enclosed passage in other areas of the assembly.

While two embodiments of the assembly have been chosen to illustrate the invention, it will be understood by those skilled in the art that various changes and modifications can be made to the assembly without departing from the scope of the invention as defined in the appended claims.

What is claimed is:

1. A receptacle box assembly for use with a raceway, said assembly comprising:

a base having a bottom wall with first and second ends and first and second opposite side edges;

a channel member removably coupled to said base to define a first passage extending between said first side edge and said second side edge of said base, said channel member having a first open end adjacent said first side edge and a second open end adjacent said second side edge of said base; and a housing coupled to said base to form a cavity, where said channel member is positioned in said cavity, said housing having a top wall, first and second end walls and first and second side walls, said first and second side walls having at least one separable member aligned with said first and second open ends of said channel member, respectively, and said housing having at least one opening for receiving a receptacle.

2. The assembly of claim 1, wherein said channel member has a top wall spaced from said bottom wall of said base, and opposite side walls extending from said top wall and being removably coupled to said bottom wall of said base.

3. The assembly of claim 2, wherein said bottom wall of said base includes a plurality of apertures, and said side walls of said channel member include at least one coupling member received in said apertures.

4. The assembly of claim 1, wherein said separable members of said side walls are defined by a tear line in said side walls and wherein each of said separable members is separable along said tear line to form an opening into said housing.

5. The assembly of claim 2, wherein said top wall of said channel has a substantially planar portion extending substantially parallel to said bottom wall of said base and a first inclined portion at said first end and a second inclined portion at said second end.

6. The assembly of claim 1, wherein said first side edge of said base includes at least one clamping member having an outwardly extending stepped member for engaging a raceway.

7. The assembly of claim 1, wherein said channel member comprises a plurality of longitudinally extending passages.

8. The assembly of claim 1, wherein said channel member comprises at least one intermediate wall to form a plurality of longitudinally extending passages.

9. The assembly of claim 1, wherein said channel member includes a top wall, side walls, and a longitudinally extending intermediate wall spaced between said side walls defining said first passage and a second passage.

10. The assembly of claim 9, wherein said top wall of said channel member includes at least one longitudinally extending frangible line.

11. The assembly of claim 10, wherein said top wall of said channel member includes at least one transverse frangible line, said at least one longitudinal frangible line and transverse frangible line defining a removable portion of said channel member, wherein said removable portion is removable to form an opening into at least one of said passages.

12. The assembly of claim 9, wherein said top wall of said channel member includes two spaced apart longitudinal frangible lines defining a central portion and first and second side portions, and wherein said intermediate wall is coupled to said central portion of said top wall.

13. The assembly of claim 12, wherein said first and second side portions of said top wall of said channel member includes two spaced apart transverse frangible lines to define an intermediate portion.

14. The assembly of claim 1, wherein said housing includes at least one dividing wall for dividing said cavity into a plurality of chambers.

15. The assembly of claim 1, wherein said channel member comprises a plurality of longitudinally extending passages and at least one longitudinally extending frangible line for separating at least one of said longitudinally extending passages from said channel member.

16. The assembly of claim 1, wherein said housing includes a dividing wall dividing said cavity into a first chamber and a second chamber.

17. The assembly of claim 16, wherein said dividing wall is removably coupled to said base.

18. The assembly of claim 16, wherein said dividing wall has a removable portion to define a recess dimensioned to receive said channel member.

19. The assembly of claim 1, wherein said at least channel member includes a removable portion, wherein said removable portion is removable to form an opening of said first passage into said cavity of said housing.

20. The assembly of claim 19, wherein said at least one channel member includes a frangible line to define said removable portion.

21. The assembly of claim 1, wherein said channel member extends between said first side wall of said housing and said second side wall of said housing and where said passage of said channel member is oriented to align with an open end of a raceway.

22. A receptacle box assembly for use with a raceway, said assembly comprising:
a base having a bottom wall with first and second ends and first and second side edges;
a channel member coupled to said base to define at least one passage, said at least one passage extending between said first side edge and said second side edge of said base; and
a housing coupled to said base to form a cavity, said housing having a top wall spaced from said base and first and second side walls, and said first side wall of said housing having a first opening aligned with said at least one passage of said channel member at said first side edge of said base.

23. The assembly of claim 22, wherein said at least one passage of said channel member has a first open end at said first side edge and a second open end at said second side edge of said base.

24. The assembly of claim 22, wherein said channel member comprises a plurality of parallel passages.

25. The assembly of claim 24, wherein said housing includes a dividing wall coupled to said base and being positioned in said cavity for dividing said cavity into a first chamber and a second chamber.

26. The assembly of claim 25, wherein said dividing wall includes a recessed area to receive said channel member.

27. The assembly of claim 22, wherein said channel member comprises a first and a second passage and said first chamber of said assembly is in communication with said first passage of said channel member, and said second chamber is in communication with said second passage of said channel member.

28. The assembly of claim 19, wherein said channel member comprises a plurality of said passages and at least one separable portion for forming an opening into said passages.

29. The assembly of claim 27, wherein said raceway comprises a first and a second of said compartments, said channel member includes a top wall, a first side wall, a second side wall, and a center wall forming a first passage and a second passage, said first passage being in communication with said first compartment of said raceway and said second passage being in communication with said second compartment of said raceway.

30. The assembly of claim 29, wherein said channel member comprises a first and a second passage and said channel member includes a first removable portion to enable communication between said cavity and said first passage.

31. The assembly of claim 30, wherein said at least one passage of said channel member includes a second removable portion to enable communication between said cavity of said housing and said second passage of said channel member.

32. The assembly of claim 31, wherein said first and second removable portions in said channel are formed by frangible lines.

33. The assembly of claim 22, wherein said channel member is positioned in said cavity of said housing and extends between said first side wall and said second side wall of said housing.

34. The assembly of claim 22, wherein said channel member is positioned in said housing and extends between said first side wall of said housing to said second side wall of said housing.

35. The assembly of claim 34, wherein said first side edge of said base includes a coupling member for coupling an end of a raceway to said base and for aligning said raceway with said at least one passage of said channel member.

36. An electrical box and raceway assembly, said assembly comprising:
a base having a bottom wall with first and second opposite side edges;

a channel member coupled to said base, said channel having at least one longitudinal passage;

a housing coupled to said base to form a cavity, said housing having a top wall spaced from said base, said top wall having an opening for receiving at least one receptacle, said housing further having a first side wall and second side wall, said first side wall having an opening aligned with said at least one longitudinal passage of said channel member; and a first raceway having at least two longitudinal compartments, said raceway having a longitudinal end dimensioned to fit in said opening in said first side wall and to align with said at least one passage of said channel member.

37. The assembly of claim 36, wherein said housing includes a dividing wall positioned in said housing dividing said cavity into a first chamber and a second chamber.

38. The assembly of claim 37, wherein said dividing wall includes a recessed portion for receiving said channel member.

39. The assembly of claim 36, wherein said channel member has a first end positioned at said first side edge of said base and a second end positioned at said second side edge of said base.

40. The assembly of claim 36, wherein said second side wall of said housing includes an opening aligned with said at least one passage of said channel member, and said assembly further comprising a second raceway dimensioned to fit in said opening in said second side wall and aligned with said at least one passage of said channel member.

41. The assembly of claim 36, wherein said channel member comprises a plurality of said passages, and said first raceway comprises a plurality of compartments.

42. The assembly of claim 36, wherein said channel member comprises a plurality of passages and at least one removable portion to enable communication between at least one of said passages and said cavity of said housing.

43. The assembly of claim 36, wherein said channel member is positioned in said cavity of said housing and extends between said first side wall and said second side wall of said housing.

44. The assembly of claim 36, wherein said longitudinal end of said raceway is coupled to first side edge of said base.

* * * * *